United States Patent
Kim et al.

(10) Patent No.: US 10,356,238 B2
(45) Date of Patent: Jul. 16, 2019

(54) COVER AND ELECTRONIC DEVICE INCLUDING THE SAME

(71) Applicant: Samsung Electronics Co., Ltd., Gyeonggi-do (KR)

(72) Inventors: Ik Sang Kim, Seoul (KR); Hyoung Shin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/863,465

(22) Filed: Jan. 5, 2018

(65) Prior Publication Data

US 2018/0191892 A1    Jul. 5, 2018

(30) Foreign Application Priority Data

Jan. 5, 2017    (KR) .................. 10-2017-0001725

(51) Int. Cl.
| | |
|---|---|
| *H04M 1/725* | (2006.01) |
| *H04B 1/3888* | (2015.01) |
| *H04M 1/02* | (2006.01) |
| *H04M 1/18* | (2006.01) |
| *A45C 11/00* | (2006.01) |
| *A45C 13/10* | (2006.01) |
| *A45C 13/00* | (2006.01) |

(52) U.S. Cl.
CPC ......... *H04M 1/72569* (2013.01); *A45C 11/00* (2013.01); *A45C 13/1069* (2013.01); *H04B 1/3888* (2013.01); *H04M 1/0245* (2013.01); *H04M 1/185* (2013.01); *A45C 13/002* (2013.01); *H04M 1/0216* (2013.01)

(58) Field of Classification Search
CPC ........... H04M 1/0245; H04M 1/72569; H04M 1/185; H04M 1/0216; H04B 1/3838; H04B 1/3888; A45C 11/00; A45C 13/002
See application file for complete search history.

(56) References Cited

U.S. PATENT DOCUMENTS

| | | | |
|---|---|---|---|
| 8,490,783 B1 | 7/2013 | Fan | |
| 9,451,818 B2 * | 9/2016 | Buechin | ................. A45C 11/00 |
| 9,686,878 B2 | 6/2017 | Choi et al. | |
| 9,814,289 B2 * | 11/2017 | Lay | ....................... H04M 1/185 |

(Continued)

FOREIGN PATENT DOCUMENTS

| | | |
|---|---|---|
| EP | 3 110 115 | 12/2016 |
| KR | 10-20140122385 | 10/2014 |

(Continued)

OTHER PUBLICATIONS

European Search Report dated Apr. 18, 2018 issued in counterpart application No. 18150484.6-1216, 11 pages.

*Primary Examiner* — Thanh C Le
(74) *Attorney, Agent, or Firm* — The Farrell Law Firm, P.C.

(57) ABSTRACT

A cover of an electronic device is disclosed and includes a mounting part in which the electronic device is mounted, a bottom part connected to one end of the mounting part, a connecting part extending from the bottom part, and a cover part fastened to the connecting part and disposed to cover the mounting part or disposed side by side with the bottom part. The cover part has at least a portion with a specified transparency and has, on a side of the cover part, a transparent conductive pattern having at least one of an electric force and a magnetic force.

19 Claims, 12 Drawing Sheets

(56) References Cited

U.S. PATENT DOCUMENTS

| | | |
|---|---|---|
| 2016/0046103 A1 | 2/2016 | Hong et al. |
| 2016/0155375 A1 | 6/2016 | Park |
| 2016/0249731 A1 | 9/2016 | Jo et al. |
| 2016/0255736 A1 | 9/2016 | Choi et al. |
| 2016/0380335 A1 | 12/2016 | Jeong et al. |
| 2017/0026069 A1 | 1/2017 | Kim et al. |
| 2017/0250721 A1 | 8/2017 | Choi et al. |

FOREIGN PATENT DOCUMENTS

| | | |
|---|---|---|
| KR | 10-2015-0061454 | 6/2015 |
| KR | 10-2016-0016412 | 2/2016 |
| WO | WO 2015/133827 | 9/2015 |

\* cited by examiner

COVER AND ELECTRONIC DEVICE INCLUDING THE SAME

PRIORITY

This application claims priority under 35 U.S.C. § 119(a) to Korean Patent Application No. 10-2017-0001725 filed in the Korean Intellectual Property Office on Jan. 5, 2017, the disclosure of which is incorporated herein by reference.

BACKGROUND

1. Field of the Disclosure

The present disclosure relates generally to a cover for an electronic device.

2. Description of Related Art

Portable electronic devices may be damaged by dropping. Detachable covers capable of protecting side surfaces and a rear surface of an electronic device have been devised to prevent damage to electronic devices.

A detachable cover in the related art has opaque regions surrounding an electronic device. Due to this, a user is inconvenienced when opening or closing a part of the cover covering a display area of the electronic device every time the user wants to view the display area of the electronic device, although the cover can prevent damage to the electronic device.

SUMMARY

The present disclosure has been made to address at least the above-mentioned disadvantages and to provide at least the advantages described below.

Accordingly, an aspect of the present disclosure provides a cover having a transparent region covering at least part of a display of an electronic device and facilitating recognizing opening/closing of the cover, and an electronic device including the same. The cover, and the electronic device including the same, allows for viewing the entire display and provides various functions according to opening/closing of the cover.

In accordance with an aspect of the present disclosure, a cover of an electronic device is provided. The cover includes a mounting part in which the electronic device is mounted, a bottom part connected to one end of the mounting part, a connecting part extending from the bottom part, and a cover part fastened to the connecting part, the cover part being disposed to cover at least a portion of the mounting part or disposed side by side with the bottom part according to an arrangement state, wherein the cover part has at least a region with a specified transparency and includes a transparent conductive pattern having at least one of an electric force or a magnetic force.

In accordance with another aspect of the present disclosure, an electronic device is provided that includes a housing of the electronic device, a cover including a mounting part in which at least part of the housing is mounted, a bottom part connected to one end of the mounting part, a connecting part extending from the bottom part, and a cover part fastened to the connecting part and disposed to cover the mounting part or disposed side by side with the bottom part, the cover part having at least a portion with a specified transparency and having, on a side of the cover part, a transparent conductive pattern having at least one of an electric force or a magnetic force, a sensor configured to recognize at least one of an electric force variation or a magnetic force variation caused by the transparent conductive pattern, and a processor configured to determine whether the cover is closed or open on the basis of a signal sensed by the sensor, output a specified first screen while the cover is closed, or output a specified second screen while the cover is open.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1A:
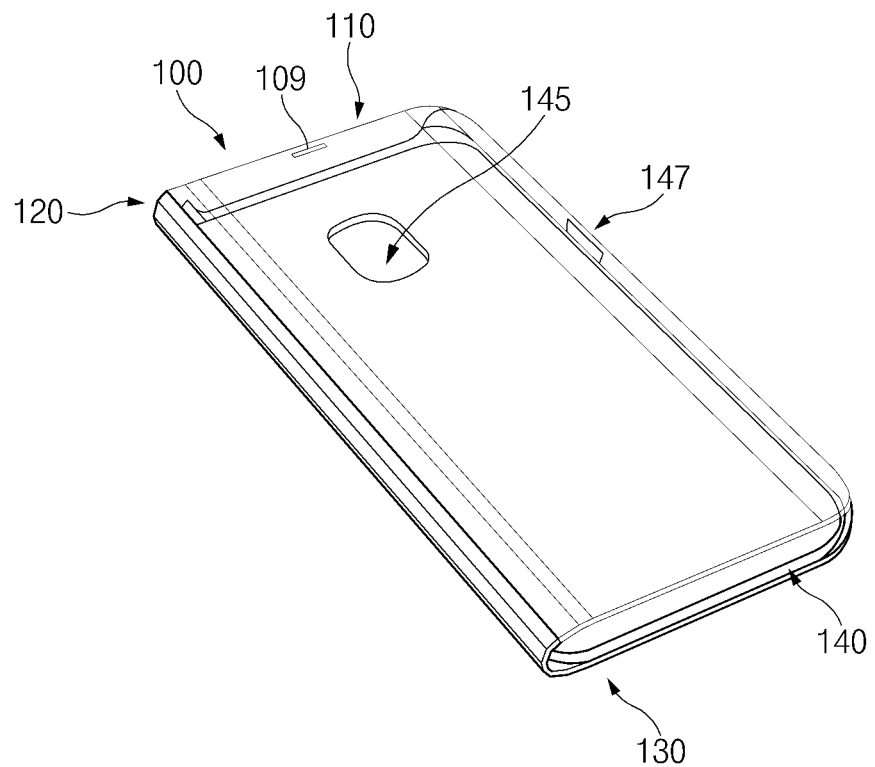
FIG. 1A illustrates an example of an external appearance of a cover, according to an embodiment of the present disclosure.

Embodiments of the present disclosure are described in detail with reference to accompanying drawings. The same or similar elements may be marked by similar reference numerals although they are illustrated in different drawings. Those of ordinary skill in the art will recognize that modifications, equivalents, and/or alternatives of the embodiments described herein can be made without departing from the scope and spirit of the present disclosure.

In this disclosure, the expressions "have", "may have", "include", "comprise", "may include" and "may comprise" indicate the existence of corresponding features and elements (e.g., numeric values, functions, operations, or components), but do not exclude the presence of additional features.

The expressions "A or B", "at least one of A or/and B", or "one or more of A or/and B" may include any and all combinations of one or more of the associated listed items. For example, the terms "A or B", "at least one of A and B", or "at least one of A or B" may refer to (1) where at least one A is included, (2) where at least one B is included, or (3) where at least one A and at least one B are included.

The terms "first" and "second" may refer to various elements, but do not limit the elements. Furthermore, such terms may be used to distinguish one element from another element. For example, "a first user device" and "a second user device" may indicate the same user device regardless of the order or priority thereof, or "a first user device" and "a second user device" indicate different user devices.

It will be understood that when an element (e.g., a first element) is referred to as being "(operatively or communicatively) coupled with/to" or "connected with/to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

As used herein, the expression "configured to" may be used interchangeably with other the expressions, such as "suitable for", "having the capacity to", "designed to", "adapted to", "made to", or "capable of". The expression "a device configured to" may mean that the device is "capable of" operating together with another device or other components. A "processor configured to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs stored in a memory device.

Terms used herein describe specified embodiments and are not intended to limit the scope of the present disclosure. The terms of a singular form may include plural forms unless otherwise specified. Unless otherwise noted, all of the terms used herein, including technical or scientific terms, may have the same meaning that is generally understood by a person skilled in the art. Terms, which are defined in a dictionary and commonly used, should also be interpreted as is customary in the relevant related art and not in an idealized or overly formal manner unless expressly so defined herein, according to embodiments of the present disclosure. In some cases, even if terms are terms which are not defined in the specification, they may not be interpreted to exclude embodiments of the present disclosure.

An electronic device may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, mobile medical devices, cameras, wearable devices (e.g., head-mounted-devices (HMDs) such as electronic glasses), electronic apparel, electronic bracelets, electronic necklaces, electronic accessories, electronic tattoos, and smart watches.

The electronic devices may be home appliances including at least one of, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, or electronic picture frames.

The photographing apparatus may include at least one of a portable medical measurement device (i.e., a blood glucose monitoring device, a heartbeat measuring device, a blood pressure measuring device, and a body temperature measuring device, a magnetic resonance angiography (MRA) device, a magnetic resonance imaging (MRI) device, a computed tomography (CT) scanner, a scanner, and an ultrasonic device), a navigation device, a global positioning system (GPS) receiver, an event data recorder (EDR), a flight data recorder (FDRs), a vehicle infotainment device, electronic equipment for vessels (e.g., navigation systems and gyrocompasses), an avionics device, a security device, a head units for vehicles, industrial or home robots, an automatic teller machine (ATM), a points of sales (POS) device, or an IoT device (e.g., a light bulb, various sensors, electric or gas meters, a sprinkler, fire alarms, a thermostat, a street light, a toaster, exercise equipment, a hot water tank, a heater, or a boiler).

The electronic device may include at least one of or a part of furniture, buildings/structures, electronic boards, electronic signature receiving devices, projectors, or various measuring instruments (e.g., water meters, electricity meters, gas meters, or wave meters). The electronic device may be one of the above-described devices or a combination thereof. An electronic device may be a flexible device. Furthermore, an electronic device may not be limited to the above-described devices and may include other electronic devices and new electronic devices, according to the development of technologies.

The term "user", as used herein, may refer to a person who uses an electronic device or may refer to a device (e.g., an artificial intelligence electronic device) that uses an electronic device.

Figure 1B:
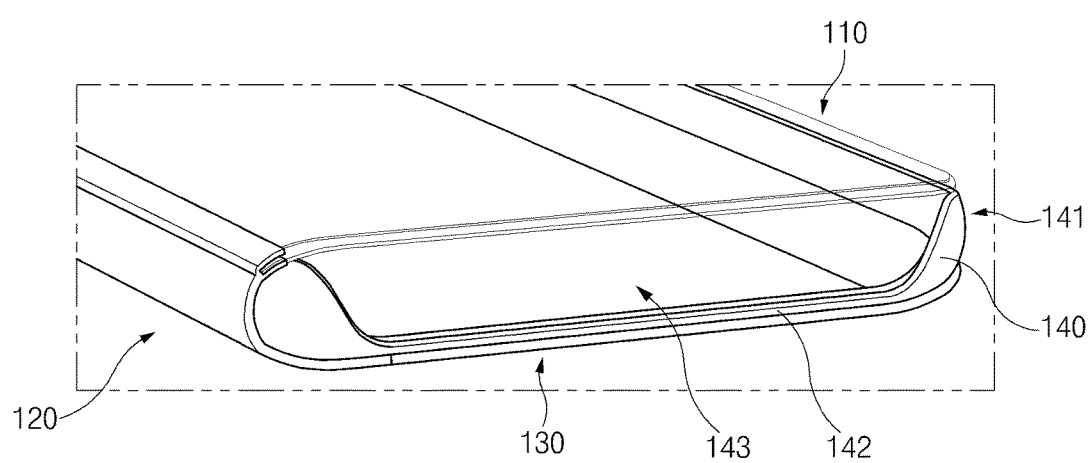
FIG. 1B illustrates one side of the external appearance of the cover, according to an embodiment of the present disclosure.
Figure 2:
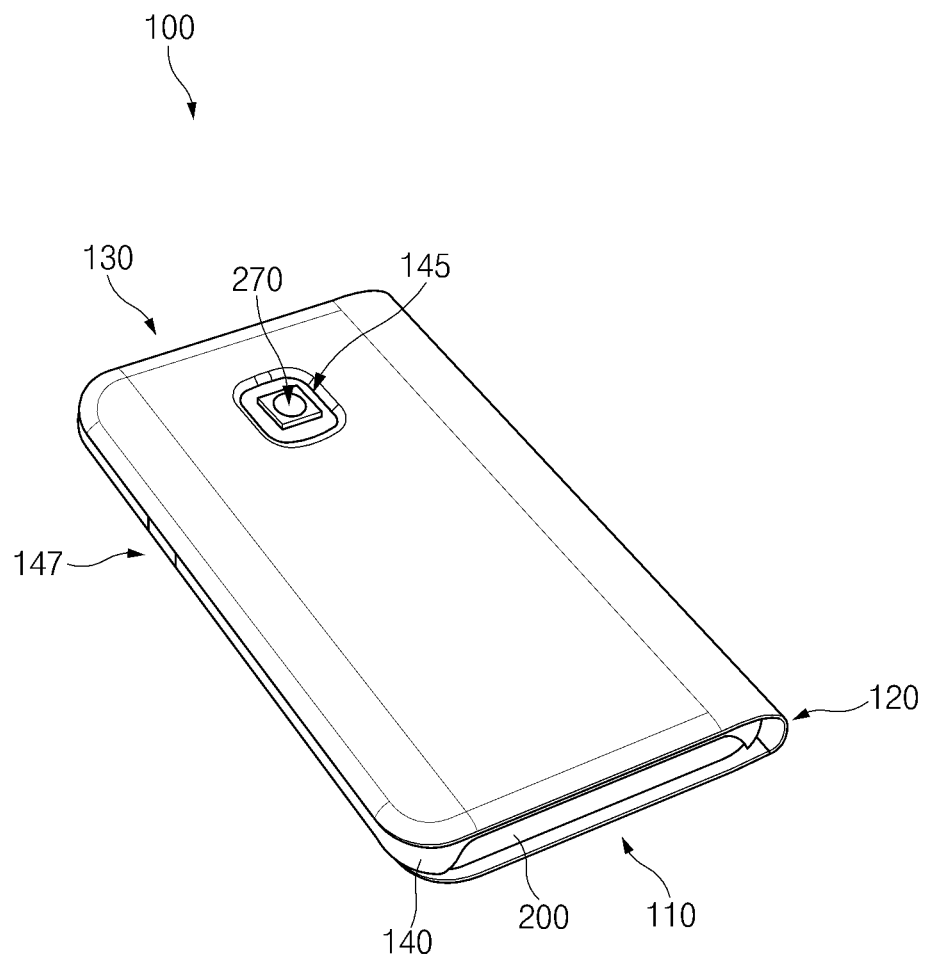
FIG. 2 illustrates a rear side of the cover in which an electronic device is mounted, according to an embodiment of the present disclosure.

FIG. 1A illustrates an example of an external appearance of a cover, according to an embodiment of the present disclosure, and FIG. 1B is one side of the external appearance of the cover, according to an embodiment of the present disclosure. FIG. 2 illustrates a rear side of the cover in which an electronic device is mounted, according to an embodiment of the present disclosure.

Referring to FIGS. 1A, 1B, and 2, a cover 100, according to an embodiment of the present disclosure, includes a mounting part 140 in which an electronic device 200 is mounted, a bottom part 130 connected to one end of the mounting part 140 that provides support for the mounting part 140, a cover part 110 configured to cover a display of the electronic device 200, and a connecting part 120 extending from the bottom part 130 to connect the bottom part 130 and the cover part 110.

The mounting part 140 may have a size similar to that of the electronic device 200 and may be configured to surround at least part of the electronic device 200. For example, the mounting part 140 includes a mounting surface 143 on which the rear surface of the electronic device 200 (e.g., a smartphone) is mounted, a support surface 142 disposed below the mounting surface 143, and at least one corner portion 141 extending upward from an edge of the support surface 142 at a predetermined angle. The corner portion 141 may be formed on at least one of the four corners of the rectangular support surface 142. The corner portion 141 of the mounting part 140 may be formed of a material, such as a plastic, an acrylic resin, or polyethylene terephthalate (PET), with a specified magnitude of elasticity.

Longitudinal edge regions of the mounting part 140 may have a predetermined height to surround at least part of longitudinal sides of the electronic device 200. Lateral edge regions of the mounting part 140 may be open to expose lateral sides of the electronic device 200. The mounting surface 143 of the mounting part 140 may be formed of an opaque material (e.g., polyurethane, cotton flannel, leather, or fabric). The support surface 142 of the mounting part 140 may be formed of the same material (e.g., PET, plastic, or an acrylic resin) as that of the corner portion 141. An adhesive layer may be disposed between the mounting surface 143 and the support surface 142.

The bottom part 130 is disposed on the rear surface of the mounting part 140. The mounting part 140 has a camera hole 145 vertically formed through a region thereof to expose at least a part (e.g., a lens part) of a camera 270 of the electronic device 200 to the outside. The mounting part 140 has a power button hole 147 (or a power button recess) formed in one edge region (e.g., a right longitudinal edge region) to expose a power button of the electronic device 200 to the outside. The mounting part 140 may have a volume button hole (or a volume button recess) formed in an opposite edge region (e.g., a left longitudinal edge region) to expose a volume button of the electronic device 200 to the outside.

The bottom part 130 is disposed below the mounting part 140 and bonded to at least a part of the rear surface of the mounting part 140. The entire upper surface of the bottom part 130 may be bonded to the rear surface of the mounting part 140. Alternatively, only a right region of the bottom part 130 may be bonded to a right edge region of the mounting part 140. In this regard, an adhesive layer of a predetermined size may be disposed between the bottom part 130 and the mounting part 140. The bottom part 130 may be connected, at one side thereof, to the connecting part 120. The bottom part 130 may be the same size as the entire surface of the mounting part 140 or may be larger than the entire surface of the mounting part 140 by a specified size or more.

The bottom part 130 has an opening corresponding to the camera hole 145 of the mounting part 140. The bottom part 130 may have a logo disposed in at least a region thereof. The bottom part 130 may be formed of an opaque material, such as resin (polyurethane), cotton flannel, leather, silk, or fabric. The bottom part 130 may be formed of the same material as that of the mounting surface 143 of the mounting part 140. The bottom part 130 may have a multi-layer structure having a plurality of opaque layers bonded together. In the multi-layer structure, at least one adhesive layer may be disposed between the layers to bond the layers.

The connecting part 120 is disposed between the bottom part 130 and the cover part 110, and may extend from one side of the bottom part 130. Accordingly, one side of the connecting part 120 may be connected with the one side of the bottom part 130. The connecting part 120 may be formed of the same material as that of the bottom part 130 or may have the same structure as the bottom part 130. The connecting part 120 may be curved or bent at a predetermined angle with respect to one side of the bottom part 130 fixed to the mounting part 140. The connecting part 120 may be coupled, at an opposite side thereof, with the cover part 110. The opposite side of the connecting part 120 may be bonded to one side of the cover part 110. In this regard, an adhesive layer may be disposed on at least a region between the opposite side of the connecting part 120 and the one side of the cover part 110.

The cover part 110 may have an area similar to or the same as that of a front display area of the electronic device 200 and may be formed of a transparent material having a specified transparency level or more. The cover part 110 may be formed of a polyethylene terephthalate film, a transparent acrylic resin, transparent plastic, or reinforced glass. The cover part 110 may be flat. Alternatively, an edge (e.g., at least one of an opposite edge) of the cover part 110 may have a curved shape with a predetermined curvature, and the central region of the cover part 110 may include a flat region. Corner regions of the lower surface of the cover part 110 may be supported by corner regions of the mounting part 140. The cover part 110 may have a receiver hole 109 formed on an upper side thereof to correspond to a receiver of the electronic device 200.

Figure 3:
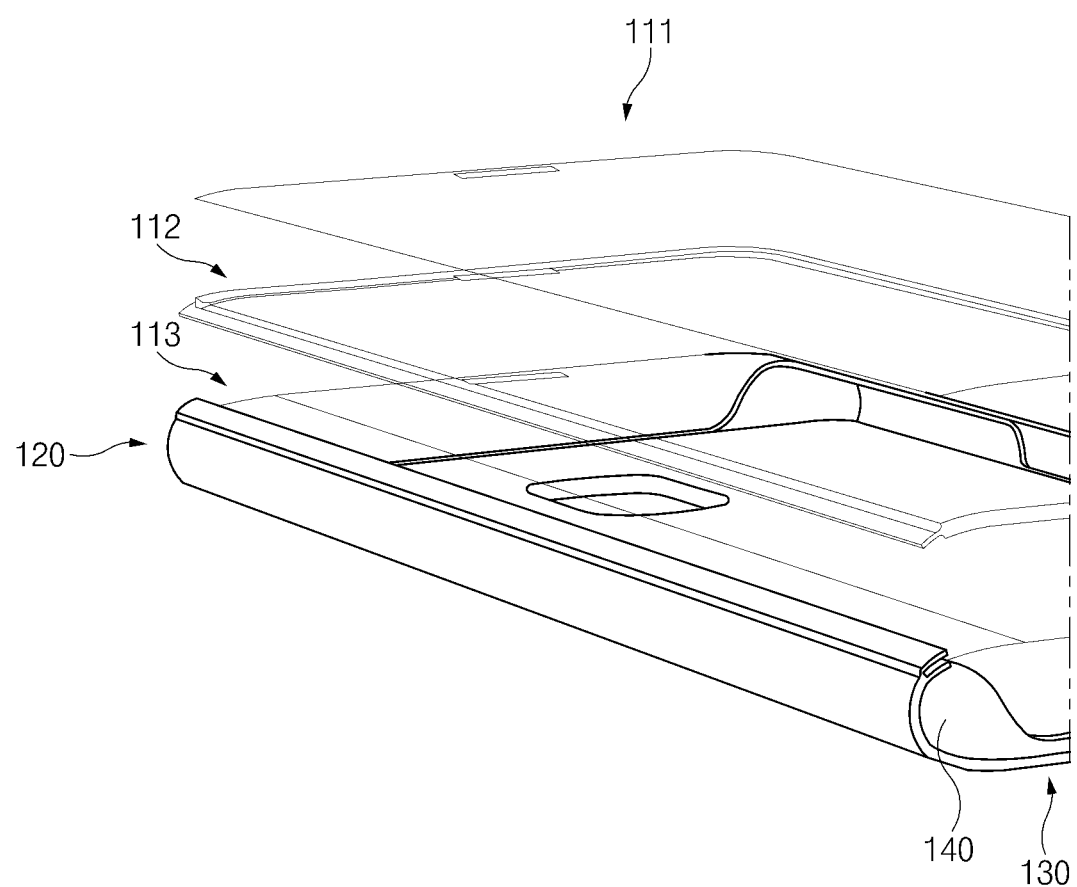
FIG. 3 illustrates an example of a cover part, according to an embodiment of the present disclosure.

FIG. 3 illustrates an example of a cover part, according to an embodiment of the present disclosure.

Referring to FIGS. 2 and 3, the cover part 110 is connected with one side of the connecting part 120 and may rotate in one direction to cover the mounting part 140, or may rotate in the opposite direction to uncover the mounting part 140, in response to a rotation of the connecting part 120. The cover part 110 includes an upper cover layer 111, a cover body 112, and a lower cover layer 113.

The upper cover layer 111 may be formed of a transparent sheet. The upper cover layer 111 may include a hard coating layer to prevent scratches caused by a physical force applied from the outside. Alternatively, the upper cover layer 111 may be implemented with an anti-scratch layer. The upper cover layer 111 may include a UV coating layer. The upper cover layer 111 may have a transparent adhesive layer, such as an optically clear adhesive (OCA), disposed on a lower portion thereof. The upper cover layer 111 may be laminated on an upper surface of the cover body 112.

The cover body 112 may have a predetermined thickness and may include a region of the same size as the display area of the electronic device 200, or the cover body 112 may include a region larger than the display area by a specified size. The cover body 112 is disposed between the upper cover layer 111 and the lower cover layer 113. As mentioned above, a transparent adhesive layer may be disposed between the cover body 112 and the upper cover layer 111. A transparent adhesive layer may be disposed between the cover body 112 and the lower cover layer 113. The cover body 112 may be formed of a material with a specified level of transparency and/or hardness. For example, the cover body 112 may be formed of a transparent resin.

The lower cover layer 113 is disposed on a lower portion of the cover body 112. The lower cover layer 113, at least part of which has a specified transparency level or more, may be bonded to the lower portion of the cover body 112. In this regard, a transparent adhesive layer may be disposed between the lower cover layer 113 and the cover body 112. The lower cover layer 113 may face or make contact with the display of the electronic device 200 when the electronic device 200 is mounted in the mounting part 140. The lower cover layer 113 may be formed of a soft material or a material with a predetermined elasticity to prevent scratches on the display when the electronic device 200 is mounted. The lower cover layer 113 may be formed of transparent polyurethane. Alternatively, the lower cover layer 113 may have the same form as the upper cover layer 111 or may be made of the same material as the upper cover layer 111. For example, the lower cover layer 113 may include at least one of a hard coating layer, an anti-scratch layer, and a UV coating layer to prevent scratches from being generated by a physical force applied thereto from the outside. In the case where the lower cover layer 113 is formed of a hard coating layer, rubber having a predetermined thickness and width may be disposed on the lower cover layer 113 to prevent the lower cover layer 113 from making direct contact with the electronic device 200 and the display. The lower cover layer 113 may be laminated on the lower surface of the cover body 112.

Figure 4:
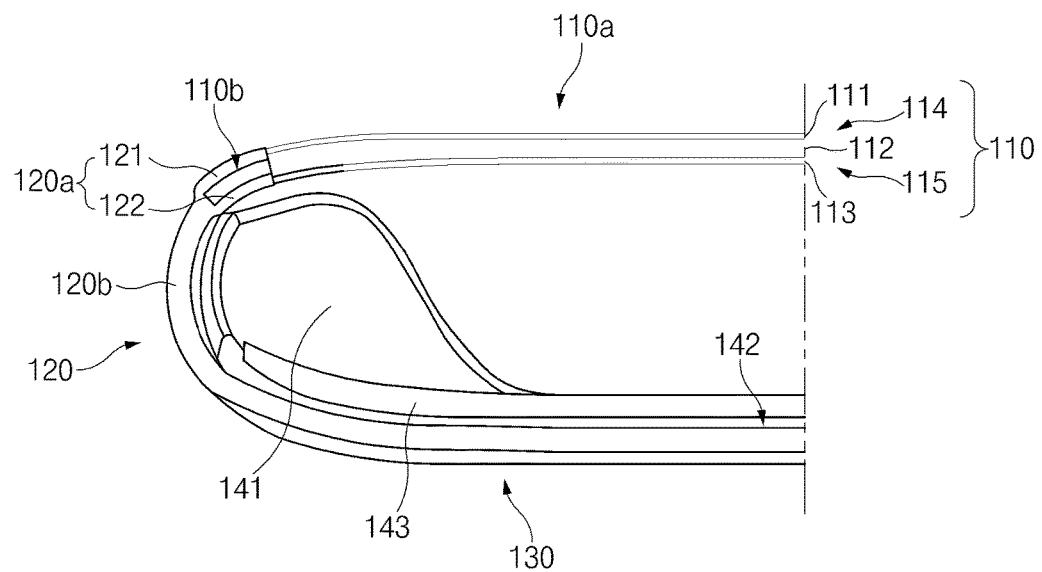
FIG. 4 illustrates an example of a cover having a connecting part, according to an embodiment of the present disclosure.
Figure 4:
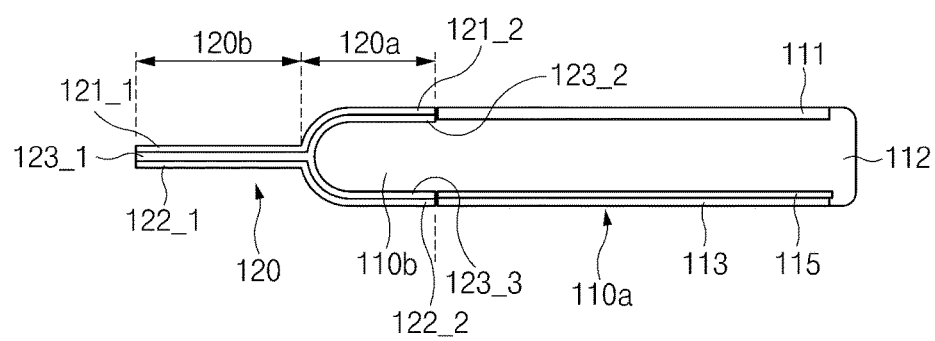

FIG. 4 illustrates an example of a cover having a connecting part, according to an embodiment of the present disclosure.

Referring to FIG. 4, the cover 100 includes the mounting part 140, the bottom part 130, the connecting part 120, and the cover part 110, as described above. The cover part 110 may rotate about the connecting part 120 to cover the front side of the mounting part 140. The mounting part 140 includes the mounting surface 143, the support surface 142, and the corner portion 141. The mounting surface 143 is disposed on the support surface 142. Alternatively, the support surface 142 may have a portion recessed to a predetermined depth, and the mounting surface 143 may be disposed in the recessed portion.

The cover part 110 includes a cover-connecting region 110b disposed to overlap the connecting part 120 and a cover body region 110a adjacent to the cover-connecting region 110b. The cover-connecting region 110b may extend from the cover body 112. The cover-connecting region 110b may have the same thickness as the cover body 112 or may be thinner than the cover body 112. Accordingly, the cover body region 110a and the cover-connecting region 110b may be provided in a stepped form.

The cover body region 110a includes the upper cover layer 111, the cover body 112, and the lower cover layer 113. A first transparent adhesive layer 114 is disposed between the upper cover layer 111 and the cover body 112, and a second transparent adhesive layer 115 is disposed between the cover body 112 and the lower cover layer 113.

A transparent conductive pattern 150 having at least one of an electric force and a magnetic force may be disposed in at least a region between the cover body 112 and the second transparent adhesive layer 115. The transparent conductive pattern 150 may include electric charges stuck to a predetermined scratch pattern formed on the cover body 112. The transparent conductive pattern 150 may be an indium tin oxide (ITO) film pattern. Alternatively, the transparent conductive pattern 150 may be directly patterned on a side of the cover part 110. In this regard, a method of forming a transparent conductive pattern having an electromagnetic force generated therein may be performed. The method may include a process of preparing the transparent cover body 112, a process of forming a transparent electrode layer with a scratch pattern in a predetermined region of the cover body 112, and a process of fixing electric charges to the scratch pattern by supplying the electric charges to opposite ends of the transparent electrode layer with the scratch pattern using a predetermined voltage level.

The connecting part 120 may extend from the bottom part 130 and may be fastened, at an opposite end thereof, to the cover part 110. The connecting part 120 includes an extension region 120b rotatable about the bottom part 130 while facing a side surface of the mounting part 140 and a fastening region 120a coupled with the cover-connecting region 110b. The connecting part 120 may include a first sheet 121 and a second sheet 122.

The extension region 120b may be the same material as that of the bottom part 130. The extension region 120b may have a multi-layer structure in which a plurality of polyurethane layers of the same material are stacked one above another. Alternatively, the extension region 120b may have a plurality of layers formed of different materials and stacked one above another. For example, the extension region 120b includes sheet 121_1 of a first material (e.g., opaque polyurethane), sheet 122_1 of a second material (e.g., an opaque resin), and sheet 123_1 of a third material (e.g., opaque fabric). Sheet 123_1 is disposed between sheet 121_1 and sheet 122_1. Sheet 121_1, sheet 122_1, and sheet 123_1 may be bonded together with a hot melt adhesive. Sheet 121_1 and sheet 122_1 may be formed of the same material. Sheet 121_1 and sheet 122_1 may have a front surface and a rear surface that have different surface states. In this case, sheet 121_1 and sheet 122_1 may be disposed such that a relatively soft surface is exposed to the outside. Accordingly, the extension region 120b to which sheet 121_1 and sheet 122_1 are bonded may have a front surface and a rear surface having the same surface state.

The fastening region 120a may include at least some of sheet 121_2, sheet 122_2, sheet 123_2, and sheet 123_3 disposed on the cover-connecting regions 110b. In some embodiments, the fastening region 120a includes sheet 121_2 and sheet 123_2 disposed on an upper surface of the cover-connecting region 110b, and sheet 122_2 and sheet 123_3 disposed on a lower surface of the cover-connecting region 110b. Sheet 121_2 extends from sheet 121_1, and sheet 122_2 extends from sheet 122_1. Sheet 123_2 and sheet 123_3 branch from an end of sheet 123_1 and are disposed on the cover-connecting region 110b with a predetermined gap therebetween.

In some embodiments, the fastening region 120a includes only sheet 121_2 and sheet 122_2, excluding sheet 123_2 or sheet 123_3, in which sheet 121_2 is disposed on the upper surface of the cover-connecting region 110b and sheet 122_2 is disposed on the lower surface of the cover-connecting region 110b. In the fastening region 120a, the upper surface of sheet 121_2 is located at the same height as, or a height similar to, that of the upper surface of the cover body region 110a, and thus the upper surface of sheet 121_2 and the upper surface of the cover body region 110a may be disposed as a continuous surface. In the fastening region 120a, the lower surface of sheet 122_2 is located at the same height as, or a height similar to, that of the lower surface of the cover body region 110a, and thus the lower surface of sheet 122_2 and the lower surface of the cover body region 110a may be disposed as a continuous surface.

Figure 5:
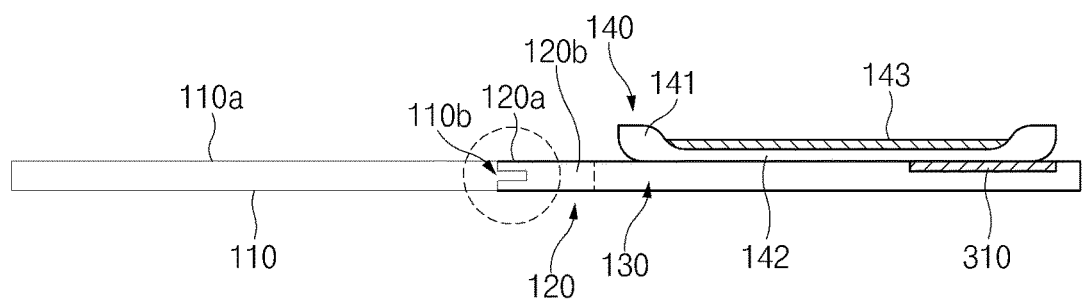
FIG. 5 illustrates another example of a cover, according to an embodiment of the present disclosure.

FIG. 5 illustrates another example of a cover, according to an embodiment of the present disclosure.

Referring to FIG. 5, the cover 100 includes the mounting part 140, the bottom part 130, the connecting part 120, and the cover part 110. The cover part 110 and the connecting part 120 may be disposed side by side with the bottom part 130, as illustrated in FIG. 5. For example, where the cover part 110, the connecting part 120, and the bottom part 130 are situated on a flat place, such as a desk, the cover part 110, the connecting part 120, and the bottom part 130 may be arranged side by side. According to various embodiments, the connecting part 120 may be inclined at a predetermined angle with respect to the ground when the bottom part 130 is bonded to a lower end of the curved corner portion 141 of the mounting part 140 while being connected to the mounting part 140.

The mounting part 140 includes the corner portion 141, the support surface 142, and the mounting surface 143, as illustrated in FIG. 5. While FIG. 5 illustrates that the mounting surface 143 is located at a higher position than the support surface 142, the present disclosure is not limited thereto. For example, in the case where the mounting surface 143 is placed in a recess on the support surface 142, the mounting surface 143 may be located at the same height as the support surface 142 or at a lower position than the support surface 142.

As mentioned above, the bottom part 130 is disposed below the mounting part 140, and at least a portion of the bottom part 130 may be bonded to the mounting part 140. FIG. 5 illustrates a state in which a region of the bottom part 130 is bonded to a region of the mounting part 140. In this regard, the cover 100 includes a bottom bonding layer 310 disposed between an edge region of the bottom part 130 and an edge region of the mounting part 140. The bottom bonding layer 310 may allow the cover 100 to rotate about the region of the mounting part 140 to which the bottom bonding layer 310 is bonded. In this case, the cover part 110, the connecting part 120, and a region of the bottom part 130 may be individually inclined at a predetermined angle to form a support stand having a triangular cross-section.

As described above, with reference to FIG. 4, the connecting part 120 may be configured to surround the cover-connecting region 110b protruding from the end of the cover body region 110a of the cover part 110 toward the connecting part 120. As illustrated in FIG. 5, the sum of the thickness of the cover-connecting region 110b and the thickness of the fastening region 120a of the connecting part 120 may be equal or similar to the thickness of the cover body region 110a (e.g., the sum may be approximate to the thickness of the fastening region 120a, within a predetermined error range). Accordingly, the cover 100 may form a surface to which the fastening region 120a is smoothly connected without protruding further beyond its surroundings.

Figure 6A:
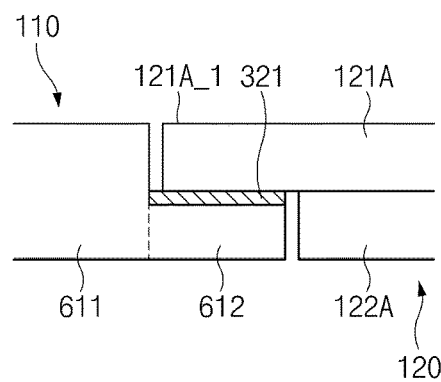
FIG. 6A illustrates an example of a fastening region of a connecting part of a cover, according to an embodiment of the present disclosure.

FIG. 6A illustrates an example of a fastening region of a connecting part of a cover, according to an embodiment of the present disclosure.

Referring to FIG. 6A, the cover part 110 includes a first cover body region 611 having a predetermined thickness and width, and a first cover-connecting region 612 protruding from an end of the first cover body region 611 towards the connecting part 120. A lower surface of the first cover-connecting region 612 may be located at the same height as a lower surface of the first cover body region 611, and the first cover-connecting region 612 may be thinner than the first cover body region 611. The first cover body region 611 and the first cover-connecting region 612 may be provided in a vertically stepped form. A transparent resin included in the first cover-connecting region 612 may be thinner than a transparent resin disposed on the first cover body region 611. A first adhesive layer 321 may be disposed on the first cover-connecting region 612.

The connecting part 120 includes a first sheet 121A and a second sheet 122A. The first sheet 121A includes, for example, the first protrusion 121A_1. The first protrusion 121A_1 may protrude further toward the cover part 110, beyond the second sheet 122A, by a predetermined length (e.g., the length of the first cover-connecting region 612). The first protrusion 121A_1 may be bonded to the first cover-connecting region 612 by the first adhesive layer 321 disposed on the first protrusion 121A_1.

An adhesive layer may be disposed on at least a region of the gap between a front end of the first protrusion 121A_1 and the first cover body region 611. Alternatively, an adhesive layer may be disposed on at least a region of the gap between a front end of the first cover body region 611 and a front surface of the first sheet 121A. The height of an upper surface of the first cover body region 611 may be similar to the height of an upper surface of the first protrusion 121A_1 of the first sheet 121A, and the height of the lower surface of the first cover-connecting region 612 may be similar to the height of a lower surface of the second sheet 122A. Accordingly, the cover part 110 and the connecting part 120 may be disposed as a continuous surface.

Figure 6B:
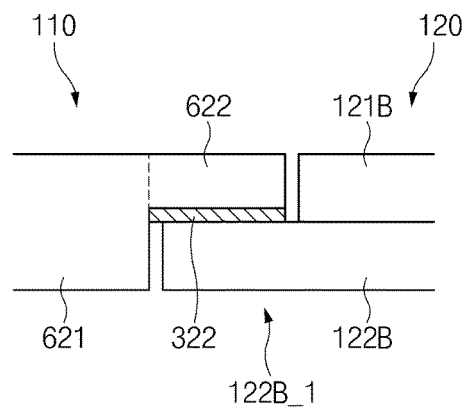
FIG. 6B illustrates another example of a fastening region of a connecting part of a cover, according to an embodiment of the present disclosure.

FIG. 6B illustrates another example of a fastening region of a connecting part of a cover according to an embodiment of the present disclosure.

Referring to FIG. 6B, the cover part 110 includes a second cover body region 621 having a predetermined thickness and width, and a second cover-connecting region 622 protruding from an end of the second cover body region 621 toward the connecting part 120. An upper surface of the second cover-connecting region 622 may be located at the same height as an upper surface of the second cover body region 621, and the second cover-connecting region 622 may be thinner than the second cover body region 621. Accordingly, the second cover body region 621 and the second cover-connecting region 622 may be provided in a stepped form.

The second cover-connecting region 622 may include an upper cover layer disposed on an upper side thereof and a transparent resin disposed below the upper cover layer. The transparent resin disposed on the second cover-connecting region 622 may be thinner than a transparent resin disposed on the second cover body region 621. A second adhesive layer 322 may be disposed on the second cover-connecting region 622. The second adhesive layer 322 may be formed of a transparent adhesive layer, or an opaque adhesive layer. For example, the second adhesive layer 322 may be formed of a hot melt adhesive. The second adhesive layer 322 may be formed of the same adhesive as that of the above-described first adhesive layer 321.

The connecting part 120 includes the first sheet 121B and the second sheet 122B. The second sheet 122B includes, for example, the second protrusion 122B_1. The second protrusion 122B_1 may further protrude beyond the first sheet 121B toward the cover part 110 by a predetermined length (e.g., the length of the second cover-connecting region 622). The second protrusion 122B_1 may be bonded to the second cover-connecting region 622 by the second adhesive layer 322 disposed on the second protrusion 122B_1.

An adhesive layer may be disposed on at least a region of the gap between a front end of the second protrusion 122B_1 and the second cover body region 621. Alternatively, an adhesive layer may be disposed on at least a region of the gap between a front end of the second cover body region 621 and a front surface of the second sheet 122B. The height of the upper surface of the second cover-connecting region 622 may be similar to the height of an upper surface of the first sheet 121B, and the height of a lower surface of the second cover body region 621 may be equal or similar, within a predetermined error range, to the height of a lower surface of the second protrusion 122B_1 of the second sheet 122B. Accordingly, the cover part 110 and the connecting part 120 may be a continuous surface.

Figure 6C:
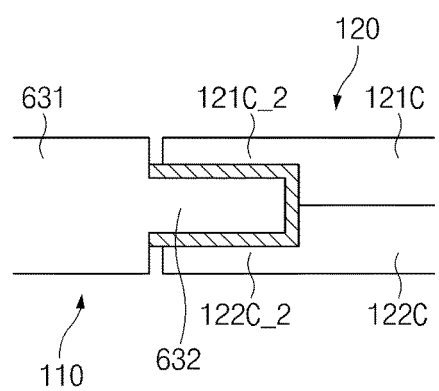
FIG. 6C illustrates another example of a fastening region of a connecting part of a cover, according to an embodiment of the present disclosure.

FIG. 6C illustrates another example of a fastening region of a connecting part of a cover, according to an embodiment of the present disclosure.

Referring to FIG. 6C, the cover part 110 includes a third cover body region 631 having a predetermined thickness and width, and a third cover-connecting region 632 protruding from an end of the third cover body region 631 toward the connecting part 120. The third cover-connecting region 632 may protrude from the center of the end of the third cover body region 631 toward the connecting part 120. The third cover-connecting region 632 may include a portion stepped to a predetermined depth from an upper surface of the third cover body region 631 toward the connecting region 120, and a portion stepped to a predetermined depth from a lower surface of the third cover body region 631 toward the connecting part 120. The third cover-connecting region 632 may be formed of a transparent resin thinner than the third cover body region 631. A third adhesive layer 323 may be disposed on at least part of the third cover-connecting region 632, such as on at least some of an upper surface, a front end, and a lower surface of the third cover-connecting region 632.

The connecting part 120 includes the first sheet 121C and the second sheet 122C. An adhesive layer may be disposed between the first sheet 121C and the second sheet 122C. The first sheet 121C may include, for example, the third protrusion 121C_2, and the second sheet 122C may include the fourth protrusion 122C_2. The third protrusion 121C_2 may have a thickness (e.g., half the thickness of the third cover-connecting region 632) smaller than the thickness of the first sheet 121C. The fourth protrusion 122C_2 may have a thickness (e.g., half the thickness of the third cover-connecting region 632) smaller than the thickness of the second sheet 122C. The third protrusion 121C_2 and the fourth protrusion 122C_2 may further protrude beyond the first sheet 121C and the second sheet 122C toward the cover part 110 by a predetermined length (e.g., the length of the third cover-connecting region 632). The third protrusion 121C_2 and the fourth protrusion 122C_2 may be bonded to the third cover-connecting region 632 by the third adhesive layer 323 disposed on a lower surface of the third protrusion 121C_2 and an upper surface of the fourth protrusion 122C_2.

An adhesive layer may be disposed on at least a region of the gap between front ends of the third and fourth protrusions 121C_2 and 122C_2, and the third cover body region 631. The height of the upper surface of the third cover body region 631 may be similar to the height of an upper surface of the third protrusion 121C_2 of the first sheet 121C, and the height of the lower surface of the third cover body region 631 may be similar to the height of a lower surface of the fourth protrusion 122C_2 of the second sheet 122C. Accordingly, the cover part 110 and the connecting part 120 may be disposed as a continuous surface.

Figure 7:
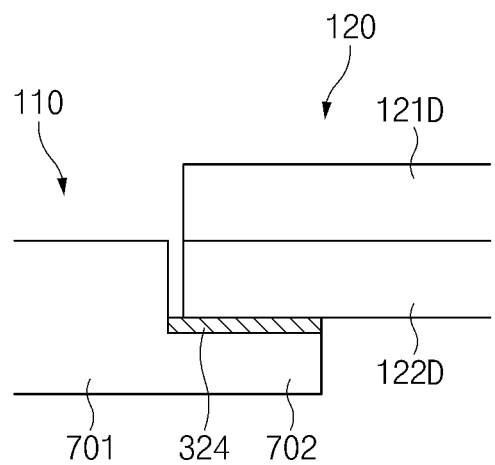
FIG. 7 illustrates another example of a fastening region of a connecting part, according to an embodiment of the present disclosure.

FIG. 7 illustrates another example of a fastening region of a connecting part according to an embodiment of the present disclosure.

Referring to FIG. 7, the cover part 110 includes a fourth cover body region 701 having a predetermined thickness and width, and a fourth cover-connecting region 702 protruding from an end of the fourth cover body region 701 toward the connecting part 120. A lower surface of the fourth cover-connecting region 702 may be located at the same height as a lower surface of the fourth cover body region 701, and the fourth cover-connecting region 702 may have a thickness (e.g., half the thickness of the fourth cover body region 701) smaller than the thickness of the fourth cover body region 701. Accordingly, the fourth cover body region 701 and the fourth cover-connecting region 702 may be provided in a vertically stepped form. A transparent resin included in the fourth cover-connecting region 702 may be thinner than a transparent resin disposed on the fourth cover body region 701. For example, a fourth adhesive layer 324 may be disposed on the fourth cover-connecting region 702.

The connecting part 120 includes the first sheet 121D and the second sheet 122D. The first sheet 121D and the second sheet 122D may have the same length. An upper surface of the second sheet 122D may be bonded to a lower surface of the first sheet 121D. An edge region of a lower surface of the second sheet 122D may be disposed to face an upper end of the fourth cover-connecting region 702. The fourth adhesive layer 324 may be disposed between a region of the lower surface of the second sheet 122D and the upper end of the fourth cover-connecting region 702. The left side of the second sheet 122D may face the right side of the fourth cover body region 701. An adhesive layer may be disposed between the left side of the second sheet 122D and the right side of the fourth cover body region 701. As described above, the connecting part 120 and the cover part 110 may be coupled together with a predetermined height difference therebetween.

According to various embodiments of the present disclosure, a cover of an electronic device includes a mounting part in which the electronic device is mounted, a bottom part connected to one end of the mounting part, a connecting part extending from the bottom part, and a cover part fastened to the connecting part, the cover part being disposed to cover at least a portion of the mounting part or disposed side by side with the bottom part, according to an arrangement state, wherein the cover part has at least a region with a specified transparency and includes a transparent conductive pattern having at least one of an electric force or a magnetic force.

The cover part may further include a cover body having a specified thickness, an upper cover layer placed on an upper portion of the cover body, and a lower cover layer placed on a lower portion of the cover body.

The transparent conductive pattern may be disposed in at least one of a predetermined region between the cover body and the upper cover layer or a predetermined region between the cover body and the lower cover layer.

The transparent conductive pattern may be disposed on the cover part to correspond to a position of a sensor for recognizing at least one of a magnetic force or an electric force of the electronic device, which is mounted in the mounting part, when the cover part is disposed to cover the mounting part.

The cover body may be formed of at least one of a transparent resin, PET, an acrylic resin, or glass.

The upper cover layer may include at least one of a UV coating layer, a hard coating layer, or an anti-scratch layer.

The lower cover layer may include at least one of a UV coating layer, a hard coating layer, an anti-scratch layer, or a transparent polyurethane layer.

The cover may further include rubber disposed on at least part of the lower cover layer.

The rubber may be disposed in a strap form along a periphery of the lower cover layer.

The cover part may further include a cover body region having at least a part with a specified transparency and configured to cover the entirety of a display of the electronic device mounted in the mounting part and a cover-connecting region extending from the cover body region toward the connecting part.

The cover-connecting region may be thinner than the cover body region.

According to various embodiments of the present disclosure, the connecting part includes a fastening region fastened to the cover-connecting region and an extension region extending from the fastening region, wherein the extension region includes a first sheet, a second sheet, and a third sheet disposed between the first sheet and the second sheet, and wherein the fastening region includes a fourth sheet bonded to an upper portion of the cover-connecting region and extending from the first sheet, a fifth sheet extending from the third sheet, a sixth sheet bonded to a lower portion of the cover-connecting region and extending from the second sheet, and a seventh sheet extending from the third sheet.

An upper surface of the fourth sheet and an upper surface of the cover body region may be continuously arranged (i.e., arranged side by side, front to back, edge to edge, edge to side, top to bottom, or in a continuous manner), and a lower surface of the sixth sheet and a lower surface of the cover body region are continuously arranged.

At least one of the first sheet and the second sheet may include polyurethane and wherein the third sheet includes fabric.

According to various embodiments of the present disclosure, the connecting part includes a first sheet and a second sheet, a first protrusion bonded to an upper portion of the cover-connecting region and protruding from the first sheet toward the cover part, and a second protrusion bonded to a lower portion of the cover-connecting region and protruding from the second sheet toward the cover part.

The connecting part may include a first sheet and a second sheet, and a protrusion bonded to an upper portion of the cover-connecting region so as to be continuously arranged together with an upper surface of the cover body region, the protrusion protruding from the first sheet toward the cover part beyond the second sheet.

The connecting part may include a first sheet and a second sheet, and a protrusion bonded to a lower portion of the cover-connecting region so as to be continuously arranged together with a lower surface of the cover body region, the protrusion protruding from the second sheet toward the cover part beyond the first sheet.

The cover part may have a form in which at least one of opposite edges is curved with a specified curvature.

According to various embodiments of the present disclosure, the mounting part includes a support surface having a specified level of stiffness, a corner portion disposed on a corner region of the support surface to fix the mounted electronic device, and a mounting surface disposed on the inside of the support surface or on an upper portion of the support surface.

Figure 8:
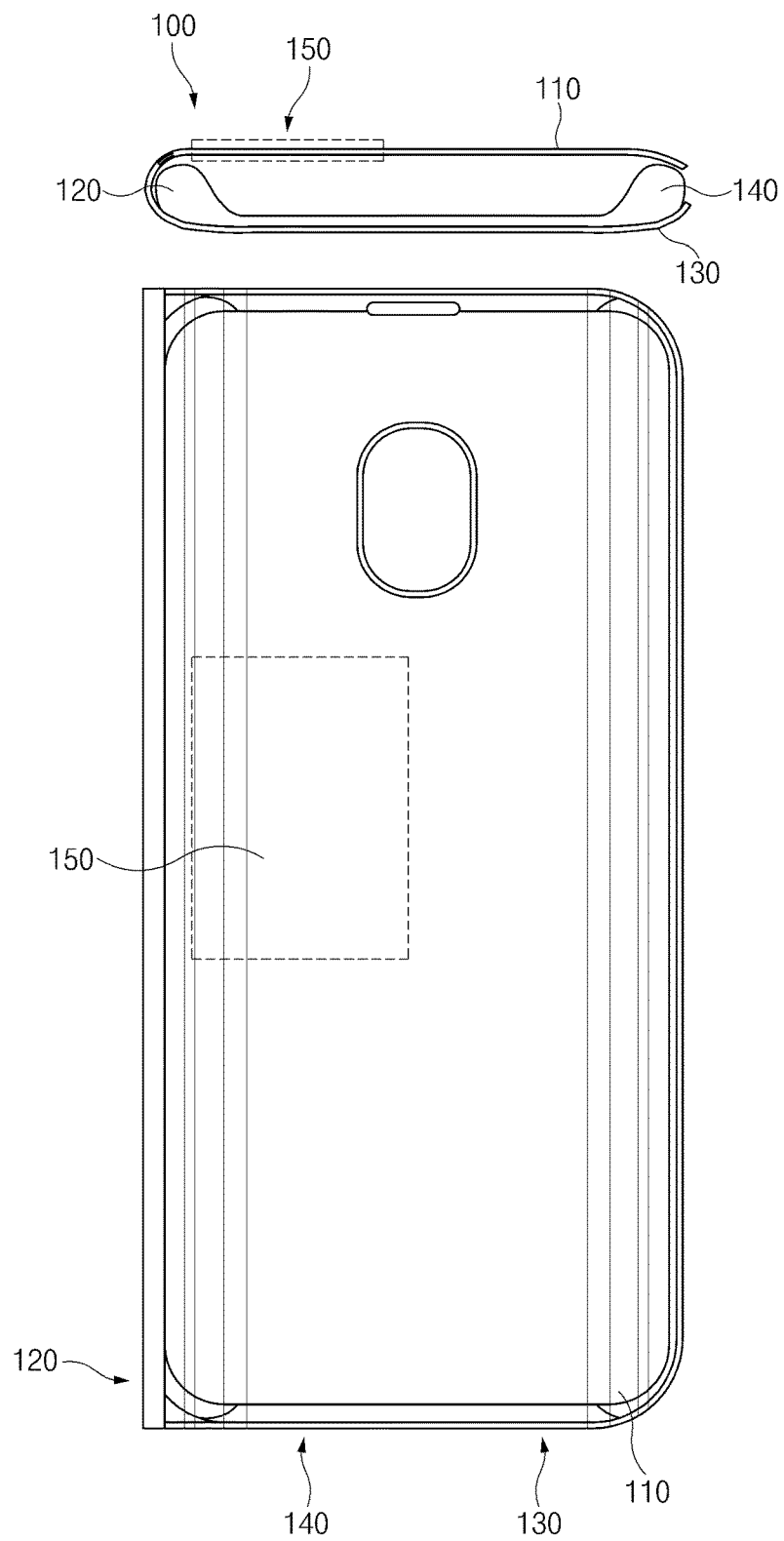
FIG. 8 illustrates an example of a cover including a transparent conductive pattern, according to an embodiment of the present disclosure.

FIG. 8 illustrates an example of a cover including a transparent conductive pattern according to an embodiment of the present disclosure.

Referring to FIG. 8, the cover 100 includes the cover part 110, the bottom part 130, the connecting part 120, the mounting part 140, and the transparent conductive pattern 150 disposed on a side of the cover part 110. The transparent conductive pattern 150 may be disposed in a central region of the cover part 110. The transparent conductive pattern 150 may be disposed on a left side of the cover part 110.

As described above with reference to FIG. 4, the transparent conductive pattern 150 may be implemented with a transparent electrode (e.g., an ITO electrode) disposed in a mesh form on a side of the cover part 110 or a transparent electrode disposed in a scratch form on the surface of the cover part 110. The transparent conductive pattern 150 may have electric charges injected therein in a high-pressure environment to represent a predetermined magnitude of electromagnetic force. The transparent conductive pattern 150 may be disposed in a predetermine region of an upper surface of a transparent resin, and a protective film (e.g., an upper cover layer) may be disposed on the transparent conductive pattern 150. Alternatively, the transparent conductive pattern 150 may be disposed in a predetermine region of a lower surface of the transparent resin, and a protective film (e.g., a lower cover layer) may be disposed to cover the transparent conductive pattern 150.

In the case where the electronic device 200 is mounted in the mounting part 140, the region in which the transparent conductive pattern 150 is disposed may be correspond to a sensor (e.g., a Hall sensor) of the electronic device 200 that recognizes at least one of an electric force and a magnetic force. Hereinafter, the sensor will be exemplified by a Hall sensor. The Hall sensor of the electronic device 200 may periodically check whether the transparent conductive pattern 150 exists, and may send a signal, according to the result, to a processor of the electronic device 200.

The transparent conductive pattern 150 may be disposed on a lower side of the cover part 110 or on an upper side of the cover part 110. For example, the transparent conductive pattern 150 may be disposed on a lower left side of the cover part 110. The transparent conductive pattern 150 may be disposed at a position corresponding to the Hall sensor of the electronic device 200 mounted in the mounting part 140. The transparent conductive pattern 150 may have a size greater than or equal to a size by which the Hall sensor of the electronic device 200 is capable of sensing at least one of a magnetic force and an electric force.

Figure 9:
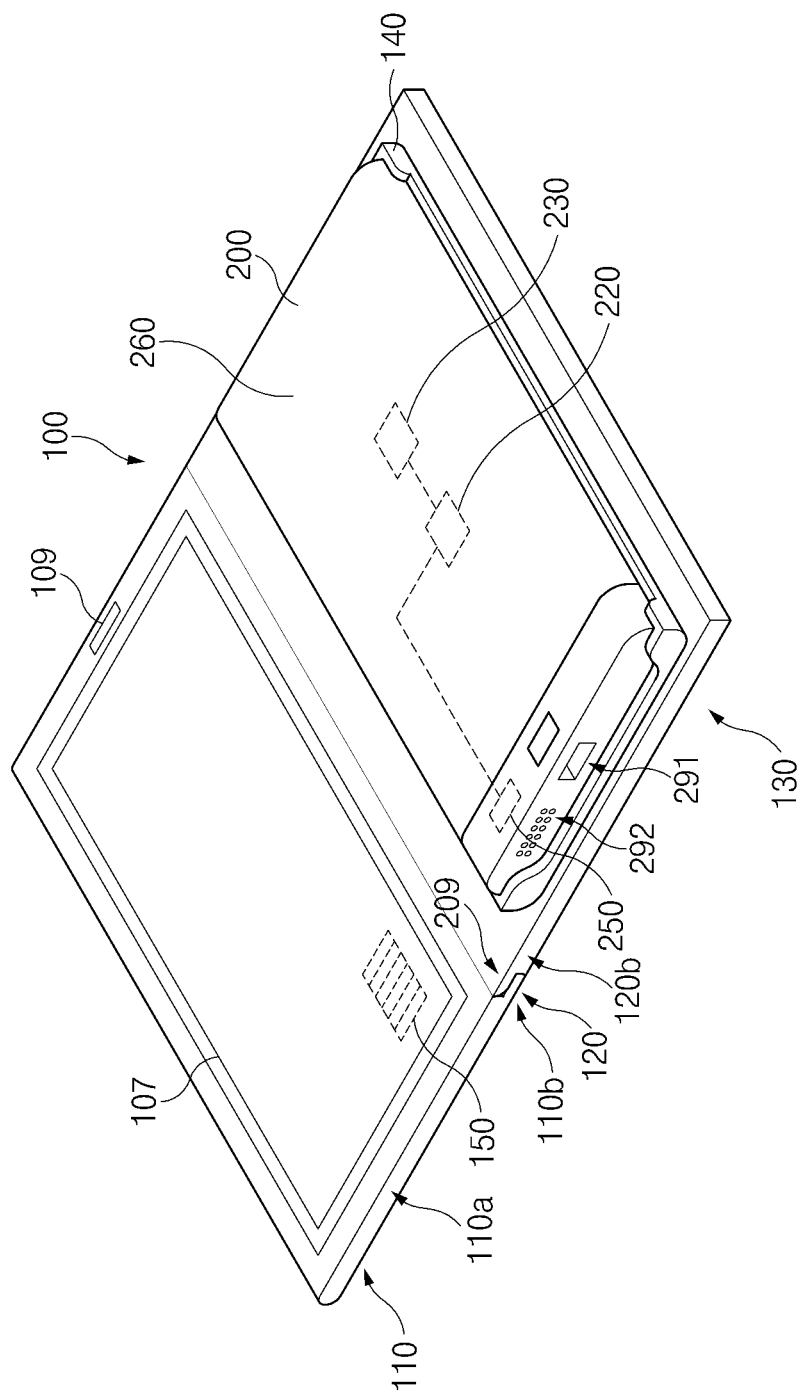
FIG. 9 illustrates an example of an electronic device having a cover mounted thereon, according to an embodiment of the present disclosure.

FIG. 9 illustrates an example of an electronic device having a cover mounted thereon, according to an embodiment of the present disclosure.

Referring to FIG. 9, the cover 100 includes the cover part 110, the bottom part 130, the mounting part 140, and the connecting part. The electronic device 200 may be mounted in the mounting part 140. The receiver hole 109 is on a side of the cover part 110 and corresponds to a receiver disposed on an upper central side of the electronic device 200. The cover part 110 includes the cover body region 110a and the cover-connecting region 110b. At least a portion of the cover part 110 may be formed of a transparent material having a specified transparency or more. The transparent conductive pattern 150 may be disposed on a side of the cover part 110. For example, the illustrated transparent conductive pattern 150 may be disposed on a lower right side of the cover part 110 based on a state in which the cover part 110 is open.

A rubber 107 for preventing scratches when making contact with a display 260 of the electronic device 200 may be disposed in a predetermined region on the inside (e.g., on a lower surface of a lower cover layer) of the cover part 110. The rubber 107 may protrude a predetermined height from the inside surface of the cover part 110 and may have a lower transparency than the cover part 110. Accordingly, the rubber 107 may be disposed in a strap form on the periphery of the cover part 110, as illustrated in FIG. 9. The rubber 107 may be omitted in the case where the inside (e.g., the lower cover layer) of the cover part 110 is formed of transparent polyurethane.

The connecting part 120 includes the fastening region 120a coupled with the cover-connecting region 110b and the extension region 120b connected with the bottom part 130. An adhesive layer may be disposed between the cover-connecting region 110b and the fastening region 120a. The mounting part 140 may include corner portions protruding to surround edge regions of the electronic device 200.

The electronic device 200 may be mounted in the mounting part 140 and protected by the cover part 110. According to an embodiment of the present disclosure, the electronic device 200 includes a processor 220, a memory 230, and a Hall sensor 250. Furthermore, the electronic device 200 includes the display 260, a home button, a speaker 292, and a connector 291. Additionally, the electronic device 200 may include a housing in which the above-described elements (e.g., the processor 220, the memory 230, the Hall sensor 250, and the display 260) are mounted. The display 260 of the electronic device 200 may be flat. Alternatively, at least a region (e.g., at least part of opposite edges) of the display 260 of the electronic device 200 may be curved.

The processor 220 may control the supply of power to the Hall sensor 250 and may also periodically supply power to the Hall sensor 250. The Hall sensor 250 may detect an electromagnetic force in response to the control of the processor 220 and transmit the detected electromagnetic force to the processor 220. The processor 220 may compare the electromagnetic force value transmitted by the Hall sensor 250 with a reference value stored in the memory 230 and determine whether the cover part 110 is in a closed state (e.g., a state in which the inside surface of the cover part 110 faces the display 260 of the electronic device 200) or an open state (e.g., a state in which the inside surface of the cover part 110 is disposed upwards). The processor 220 may execute a specified function depending on whether the cover part 110 is open or closed.

The processor 220 may lower the touch sensitivity of a touch panel of the electronic device 200 if the cover part 110 is in an open state. For example, in the case where the touch sensitivity of the touch panel is lowered, the processor 220 may process a relatively assured touch input as an actual input. The processor 220 may raise the touch sensitivity of the touch panel of the electronic device 200 if the cover part 110 is in a closed state. For example, in the case where the touch sensitivity of the touch panel is raised, the processor 220 may classify a relatively weak touch input as an actual input. The distance from an object approaching the touch panel may be recognized differently according to the adjustment of the touch sensitivity. For example, the electronic device 200 may recognize access of an object far away from the touch panel with an increase in the touch sensitivity. Accordingly, the electronic device 200 may raise the touch sensitivity to recognize and process a touch input on an upper surface of the cover part 110 even in the state in which the display 260 is covered with the cover part 110.

Figure 10:
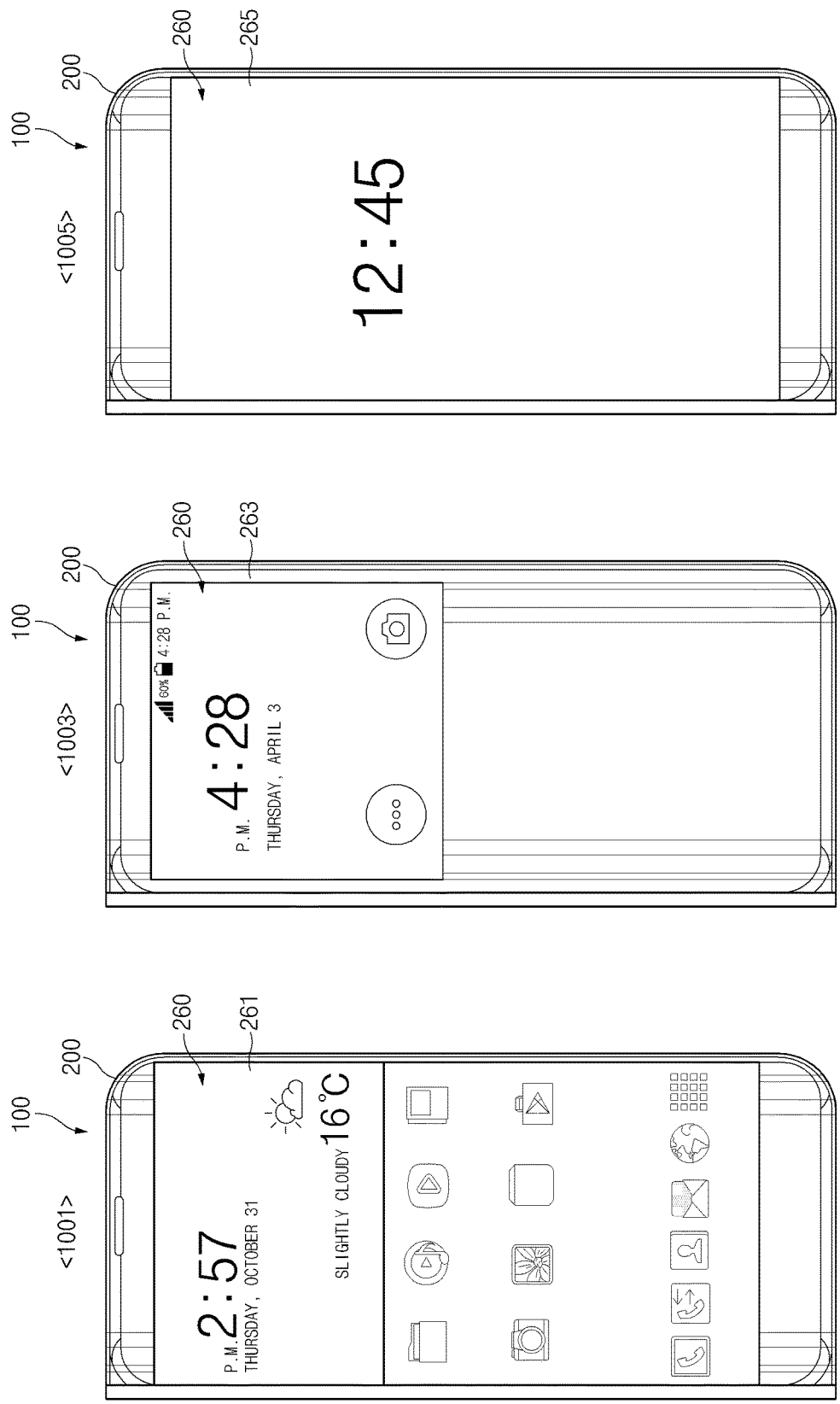
FIG. 10 illustrates an example of an electronic device having a cover mounted thereon, according to an embodiment of the present disclosure.

FIG. 10 illustrates operating an electronic device having a cover mounted thereon, according to an embodiment of the present disclosure.

Referring to FIGS. 9 and 10, the electronic device 200 having the cover 100 mounted thereon may output a specified first user interface (UI) 261 as in a state 1001 in the case where the cover part 110 of the cover 100 covers the display 260 of the electronic device 200. The first UI 261 may include a screen including at least one icon for selecting at least one application executable in the electronic device 200. The electronic device 200 may raise the touch sensitivity to a higher level to facilitate a selection of an object displayed on the first UI 261.

The electronic device 200 having the cover 100 mounted thereon may output a specified second user interface (UI) 263 as in a state 1003 in the case where the cover part 110 of the cover 100 covers the display 260 of the electronic device 200. The second UI 263 may include a limited screen interface for selecting and operating only a specified function (e.g., a menu function or a camera function). In this regard, the electronic device 200 may set the touch sensitivity to a lower level to support a selection of a predetermined object displayed on the second UI 263.

The electronic device 200 having the cover 100 mounted thereon may output a specified third user interface (UI) 265, as in a state 1005, in the case where the cover part 110 of the cover 100 covers the display 260 of the electronic device 200. The third UI 265 may include a screen having an object disposed therein, which corresponds to specified notification information (e.g., a time display function, a weather display function, or a schedule display function). In this regard, the electronic device 200 may set the touch sensitivity to a lower level such that a touch input is not performed through the cover part 110.

In regards to the display of the above-described UIs, the electronic device 200 may provide a UI selection option to be output in relation to the cover 100. The electronic device 200 may output a specified screen on the display 260, depending on whether the cover part 110 is open or closed. For example, in the state in which the cover part 110 covers the display 260, the electronic device 200 may output a screen interface on the display 260 as in the state 1003 or 1005. In the case where the cover part 110 is open, the electronic device 200 may output a screen interface on the display 260 as in the state 1001. In this regard, the electronic device 200 may sense a change in the electromagnetic force (or at least one of the electric force and the magnetic force) between the Hall sensor 250 and the transparent conductive pattern 150 of the cover part 110.

According to various embodiments of the present disclosure, an electronic device includes a housing, a cover that includes a mounting part in which at least part of the housing is mounted, a bottom part connected to one end of the mounting part, a connecting part extending from the bottom part, and a cover part fastened to the connecting part and disposed to cover the mounting part or disposed side by side with the bottom part, the cover part having at least a portion with a specified transparency and having, on a side of the cover part, a transparent conductive pattern having at least one of an electric force or a magnetic force, a sensor configured to recognize at least one of an electric force variation or a magnetic force variation caused by the transparent conductive pattern, and a processor configured to determine whether the cover is closed or open on the basis of a signal sensed by the sensor, output a specified first screen while the cover is closed, or output a specified second screen while the cover is open.

Figure 11:
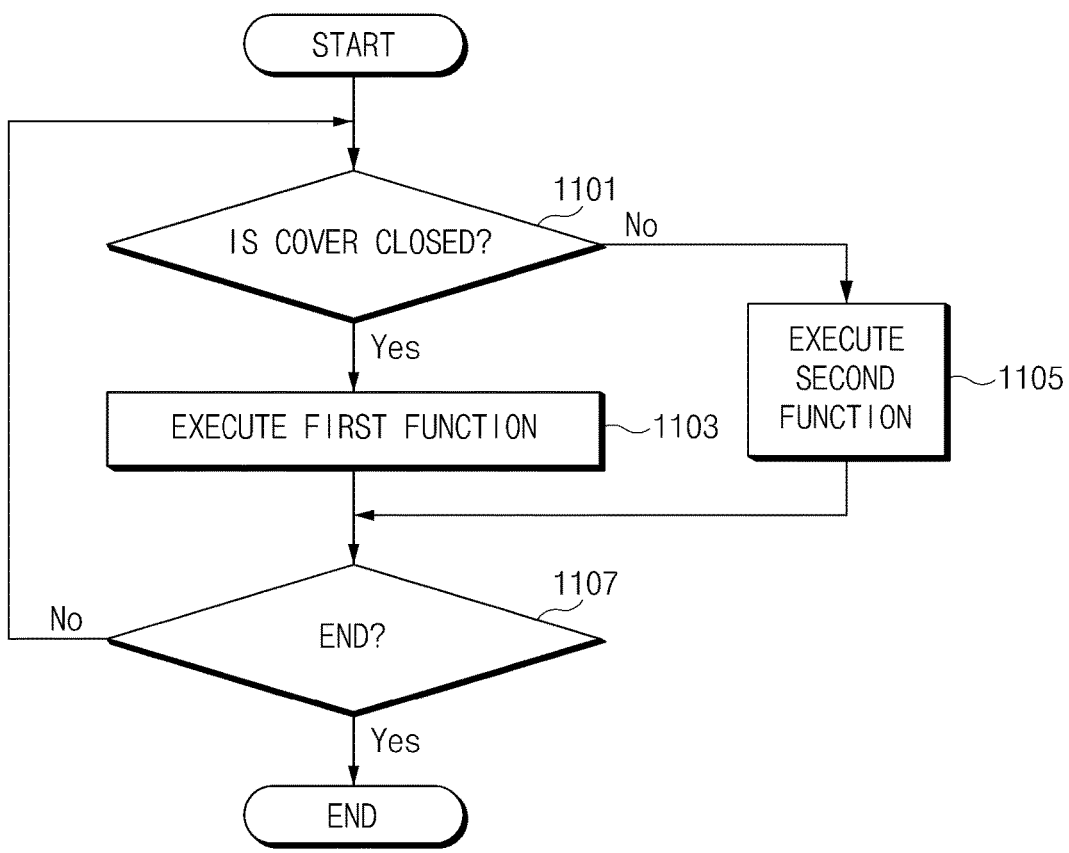
FIG. 11 is a flowchart illustrating operating an electronic device, according to an embodiment of the present disclosure.

FIG. 11 is a flowchart illustrating operating an electronic device, according to an embodiment of the present disclosure.

Referring to FIG. 11, the processor 220 of the electronic device 200 may, in step 1101, determine whether the cover 100 is in a closed state. In this regard, the processor 220 may determine whether a specified electric or magnetic force is detected, by using the Hall sensor 250. In the case where the specified electric or magnetic force is detected, the processor 220 may, in step 1103, execute a first function. For example, in the case where the specified electric or magnetic force is detected, the processor 220 may recognize a closed state in which the cover part 110 is superimposed on the display 260. In response, the processor 220 may raise the touch sensitivity of the touch panel to a specified value or higher. Alternatively, the processor 220 may turn off the touch panel and output specified information (e.g., a time display function) on the display 260.

In the case where the specified electric or magnetic force is not detected, the processor 220 may, in step 1105, execute a second function. For example, the processor 220 may determine that the cover 100 is open in the case where the specified electric or magnetic force is not detected. In this case, the processor 220 may output a lock screen or a specified user screen on the display 260. The specified user screen may include a chatting screen or the screen executed right before the display 260 is turned off.

In step 1107, the processor 220 may identify an event relating to ending the electronic device 200. For example, the processor 220 may determine whether there is a change of state corresponding to power-off. In the case where there is no event relating to ending the electronic device 200, the processor 220 may return to the state prior to step 1101 to perform the subsequent operations again.

The processor 220 may maintain the display 260 in a turned-off state while the cover 100 is in a closed state, and may output a specified user interface if the cover 100 is changed from the closed state to an open state. For example, if the cover 100 is changed from the closed state to an open state, the processor 220 may output a lock screen on the display 260 or may output a user-specified UI on the display 260.

The processor 220 may output a specified user screen if the cover 100 is changed from an open state to a closed state. For example, the processor 220 may output a time display screen on the display 260 if the cover 100 is changed from an open state to a closed state. If the cover 100 is changed from an open state to a closed state while the display 260 is in a sleep state (e.g., in a turned-off state), the processor 220 may maintain the display 260 in the sleep state without outputting a separate screen.

If the cover 100 is changed to an open state while the processor 220 outputs a first screen in the state in which the cover 100 is closed, the processor 220 may output a second screen, and if the cover 100 is changed to the closed state again, the processor 220 may output the first screen. For example, the processor 220 may output a web-surfing screen in a state in which the cover 100 is closed and may output a chatting screen in a state in which the cover 100 is open, depending on histories of executed applications or a list of settings of applications set to be executed. In the case where there is no user input on the web-surfing screen or the chatting screen for a specified period of time, the processor 220 may turn off the display 260. Thereafter, when the closed or open state of the cover 100 is changed, the processor 220 may output a specified screen corresponding to the relevant state.

The term "module", used herein, may mean a unit including one of hardware, software, and firmware or two or more combinations thereof. The term "module" may be interchangeably used with the terms, "unit", "logic", "logical block", "component", or "circuit". The "module" may be a minimum unit of an integrated component or a part thereof, may be a minimum unit performing one or more functions or a part thereof, and may be implemented mechanically or electronically. For example, the "module" may include at least one of an application-specific integrated circuit (ASIC) chip, field-programmable gate arrays (FPGAs), or a programmable-logic device that is well known or will be developed in the future, for performing certain operations.

At least part of modules, or the functions, or methods and operations, may be implemented with instructions stored in computer-readable storage media having a program module. When the instructions are executed by a processor, one or more processors may perform functions corresponding to the instructions. The computer-readable storage media may be a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), and a hardware device (e.g., a ROM, a random access memory (RAM), or a flash memory). The program instructions may include not only mechanical codes compiled by a compiler but also high-level language codes which may be executed by a computer using an interpreter and the like. The above-mentioned hardware device may be configured to operate as one or more software modules to perform operations according to embodiments of the present disclosure, and vice versa.

Modules or program modules according to embodiments of the present disclosure may include at least one or more of the above-mentioned components, or some of the above-mentioned components may be omitted or other components added. Operations executed by modules, program modules, or other components may be executed by a successive method, a parallel method, a repeated method, or a heuristic method. Also, some operations may be executed in a different order, or may be omitted, and other operations may be added.

Embodiments of the present disclosure described and shown in the drawings are provided as examples and do not limit the present disclosure. Accordingly, besides the embodiments listed herein, all modifications or modified forms derived from and based on the technical ideas of the present disclosure are included in the present disclosure as defined in the claims, and their equivalents.

The above-described embodiments of the present disclosure may be implemented in hardware, firmware or via execution of software or computer code that can be stored in a recording medium such as a CD-ROM, DVD, magnetic tape, RAM, floppy disk, hard disk, magneto-optical disk, or computer code downloaded over a network. Computer code may originally be stored on a remote recording medium, a non-transitory machine readable medium, or a local recording medium, so that the methods described herein can be rendered via software that is stored on the recording medium using a general purpose computer, a special processor, or programmable or dedicated hardware (i.e., an ASIC or a FPGA). The computer, processor, microprocessor controller, or programmable hardware including memory components (e.g., RAM, ROM, or flash) may store or receive software or computer code, that implement the processing methods described herein when accessed and executed by the computer, processor or hardware.

The control unit may include a microprocessor or any suitable type of processing circuitry, such as one or more general-purpose processors (e.g., ARM-based processors), a digital signal processor (DSP), a programmable logic device (PLD), an ASIC, a FPGA, a graphical processing unit (GPU), or a video card controller. In addition, it would be recognized that when a general purpose computer accesses code for implementing the processing shown herein, execution of the code may transform the general purpose computer into a special purpose computer for executing the processing. Any of the functions and steps provided in the Figures may be implemented in hardware and/or software, and may be performed in whole or in part within the programmed instructions of a computer. In addition, one of ordinary skill in the art understands and appreciates that a "processor", or "microprocessor", may be hardware in the claimed disclosure.

While the present disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A cover of an electronic device, the cover comprising:
a mounting part in which the electronic device is mounted;
a bottom part connected to one end of the mounting part;
a connecting part extending from the bottom part; and
a cover part fastened to the connecting part, the cover part being disposed to cover at least a portion of the mounting part or disposed side by side with the bottom part according to an arrangement state,
wherein the cover part has at least a region with a specified transparency and includes a transparent conductive pattern disposed on the cover part to correspond to a position of a sensor for recognizing at least one of a magnetic force and an electric force of the electronic device, which is mounted in the mounting part, when the cover part is disposed to cover the mounting part.

2. The cover of claim 1, wherein the cover part further includes:
a cover body having a specified thickness;
an upper cover layer placed on an upper portion of the cover body; and
a lower cover layer placed on a lower portion of the cover body.

3. The cover of claim 2, wherein the transparent conductive pattern is disposed in at least one of a predetermined region between the cover body and the upper cover layer and a predetermined region between the cover body and the lower cover layer.

4. The cover of claim 2, wherein the cover body is formed of at least one of a transparent resin, polyethylene terephthalate, an acrylic resin, or glass.

5. The cover of claim 2, wherein the upper cover layer includes at least one of an ultra violet coating layer, a hard coating layer, or an anti-scratch layer.

6. The cover of claim 2, wherein the lower cover layer includes at least one of an ultra violet coating layer, a hard coating layer, an anti-scratch layer, or a transparent polyurethane layer.

7. The cover of claim 2, further comprising:
rubber disposed on at least part of the lower cover layer.

8. The cover of claim 7, wherein the rubber is disposed in a strap form along a periphery of the lower cover layer.

9. The cover of claim 1, wherein the cover part further includes:
a cover body region having at least part with a specified transparency and configured to cover the entirety of a display of the electronic device mounted in the mounting part; and
a cover-connecting region extending from the cover body region toward the connecting part.

10. The cover of claim 9, wherein the cover-connecting region is thinner than the cover body region.

11. The cover of claim 10, wherein the connecting part includes:
a first sheet and a second sheet;
a first protrusion bonded to an upper portion of the cover-connecting region and protruding from the first sheet toward the cover part; and
a second protrusion bonded to a lower portion of the cover-connecting region and protruding from the second sheet toward the cover part.

12. The cover of claim 10, wherein the connecting part includes:
a first sheet and a second sheet; and
a protrusion bonded to an upper portion of the cover-connecting region so as to be continuously arranged together with an upper surface of the cover body region, the protrusion protruding from the first sheet toward the cover part beyond the second sheet.

13. The cover of claim 10, wherein the connecting part includes:
a first sheet and a second sheet; and
a protrusion bonded to a lower portion of the cover-connecting region so as to be continuously arranged together with a lower surface of the cover body region, the protrusion protruding from the second sheet toward the cover part beyond the first sheet.

14. The cover of claim 9, wherein the connecting part includes a fastening region fastened to the cover-connecting region and an extension region extending from the fastening region;
wherein the extension region includes a first sheet, a second sheet, and a third sheet disposed between the first sheet and the second sheet; and
wherein the fastening region includes:
a fourth sheet bonded to an upper portion of the cover-connecting region and extending from the first sheet;
a fifth sheet extending from the third sheet;
a sixth sheet bonded to a lower portion of the cover-connecting region and extending from the second sheet; and
a seventh sheet extending from the third sheet.

15. The cover of claim 14, wherein an upper surface of the fourth sheet and an upper surface of the cover body region are continuously arranged, and
a lower surface of the sixth sheet and a lower surface of the cover body region are continuously arranged.

16. The cover of claim 14, wherein at least one of the first sheet and the second sheet includes polyurethane, and
wherein the third sheet includes fabric.

17. The cover of claim 1, wherein at least one of opposite edges of the cover part is curved with a specified curvature.

18. The cover of claim 1, wherein the mounting part includes:
a support surface having a specified level of stiffness;
a corner portion disposed on a corner region of the support surface to fix the mounted electronic device; and
a mounting surface disposed on the inside of the support surface or on an upper portion of the support surface.

19. An electronic device comprising:
a housing;
a cover that includes a mounting part in which at least part of the housing is mounted, a bottom part connected to one end of the mounting part, a connecting part extending from the bottom part, and a cover part fastened to the connecting part and disposed to cover the mounting part or disposed side by side with the bottom part, the cover part having at least a portion with a specified transparency and having, on a side of the cover part, a transparent conductive pattern having at least one of an electric force and a magnetic force;
a sensor configured to recognize a variation of at least one of the electric force and the magnetic force caused by the transparent conductive pattern; and
a processor configured to determine whether the cover is closed or open based on a signal sensed by the sensor, output a specified first screen while the cover is closed, and output a specified second screen while the cover is open, wherein the transparent conductive pattern is disposed on the cover part to correspond to a position of the sensor for recognizing at least one of the magnetic force and the electric force of the electronic device, which is mounted in the mounting part, when the cover part is disposed to cover the mounting part.

* * * * *